United States Patent
White et al.

(10) Patent No.: US 6,445,964 B1
(45) Date of Patent: Sep. 3, 2002

(54) VIRTUAL REALITY SIMULATION-BASED TRAINING OF TELEKINEGENESIS SYSTEM FOR TRAINING SEQUENTIAL KINEMATIC BEHAVIOR OF AUTOMATED KINEMATIC MACHINE

(75) Inventors: John E. White, Melbourne, FL (US); Hollis Ambrose, Severn, MD (US); Brent A. Stancil, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/484,734

(22) Filed: Jan. 18, 2000

Related U.S. Application Data (63) Continuation-in-part of application No. 08/906,012, filed on Aug. 4, 1997, now abandoned.

(51) Int. Cl.[7] .............................................. G05B 19/18
(52) U.S. Cl. ............................ 700/61; 700/64; 700/65; 700/83; 700/86; 700/89; 700/253; 706/44; 706/920; 703/7
(58) Field of Search ......................... 700/61, 253, 254, 700/258, 257; 706/44, 920; 345/952; 703/7; 600/416

(56) References Cited

U.S. PATENT DOCUMENTS

| | | | |
|---|---|---|---|
| 4,338,672 A | 7/1982 | Perzley et al. | 700/249 |
| 4,753,569 A | 6/1988 | Pryor | 700/250 |
| 4,806,066 A | 2/1989 | Rhodes et al. | 414/729 |
| 4,841,762 A | 6/1989 | Hunter | 700/254 |
| 5,049,796 A | 9/1991 | Seraji | 318/568.1 |
| 5,136,223 A * | 8/1992 | Karakama et al. | 318/573 |
| 5,220,261 A | 6/1993 | Kempas | 318/567 |
| 5,323,327 A | 6/1994 | Carmichael et al. | 700/215 |
| 5,331,232 A | 7/1994 | Moy et al. | 318/568.11 |
| 5,341,458 A | 8/1994 | Kaneko et al. | 700/245 |
| 5,345,540 A * | 9/1994 | Schleifer et al. | 700/251 |
| 5,392,384 A | 2/1995 | Tounai et al. | 700/254 |

(List continued on next page.)

*Primary Examiner*—Thomas Black
*Assistant Examiner*—Crystal J. Barnes
(74) *Attorney, Agent, or Firm*—Allen, Dyer, Doppelt, Milbrath & Gilchrist, P.A.

(57) ABSTRACT

To train the sequential kinematic behavior of an automated telekinegenesis robot system, a virtual reality simulator is driven with kinematic parameter data derived from a teleoperational device, which models the sequential behavior to be exhibited by the target robot. Sensor outputs of the teleoperational device are processed by a geometry conversion algorithm, to generate data representative of the spatial kinematics of the robot's desired travel path. A kinematic machine simulator program within a robotic control simulation workstation simulates a virtual machine based upon the actual parameters of the robot. The virtual reality simulation program is interactive, allowing the workstation operator to selectively interrupt the operation of the machine, modify its control parameters, and then rerun the program, until the desired behavior of the target machine is achieved. When the target machine's simulated kinematic behavior produced by the virtual reality simulation workstation exhibits the desired dynamic spatial geometry profile, the customized spatial parameter data stored in the workstation is processed by the virtual reality simulation program, to produce a sequence of kinematic control instructions that are downloaded into the micro controller of the target machine. When executed, the kinematic control instructions cause the robot to exhibit its intended on-line sequential kinematic behavior.

6 Claims, 3 Drawing Sheets

U.S. PATENT DOCUMENTS

| | | | |
|---|---|---|---|
| 5,471,312 A | 11/1995 | Watanabe et al. | 358/296 |
| 5,483,440 A | 1/1996 | Aono et al. | 700/56 |
| 5,498,943 A | 3/1996 | Kimoto et al. | 318/601 |
| 5,528,116 A | 6/1996 | Snell | 318/568.13 |
| 5,535,306 A | 7/1996 | Stevens | 700/254 |
| 5,553,291 A | 9/1996 | Tanaka et al. | 709/1 |
| 5,579,442 A | 11/1996 | Kimoto et al. | 700/246 |
| 5,648,709 A | 7/1997 | Maeda | 318/568.17 |
| 5,691,909 A | 11/1997 | Frey et al. | 700/159 |
| 5,724,489 A * | 3/1998 | Yamamoto et al. | 700/245 |
| 5,892,345 A | 4/1999 | Olsen | 318/571 |
| 6,380,958 B1 * | 4/2002 | Guendel et al. | 345/848 |

\* cited by examiner

VIRTUAL REALITY SIMULATION-BASED TRAINING OF TELEKINEGENESIS SYSTEM FOR TRAINING SEQUENTIAL KINEMATIC BEHAVIOR OF AUTOMATED KINEMATIC MACHINE

CROSS-REFERENCE TO RELATED APPLICATION

This is a continuation-in-part of copending U.S. patent application Ser. No. 08/906,012 (hereinafter referred to as the '012 application), filed Aug. 4, 1997, (now abandoned) by John E. White et al, entitled: "Virtual Reality Simulation-Based Training of Sequential Behavior of Automated Kinematic Machine," assigned to the assignee of the present application, and the disclosure of which is incorporated herein.

FIELD OF THE INVENTION

The present invention relates in general to automated kinematic machines and systems, such as, but not limited to, remote tool/robot control systems, and is particularly directed to a telekinegenesis system for training the sequential kinematic behavior of an automated kinematic machine by means of a virtual reality simulator, driven with kinematic parameter data out from a teleoperational device, which models the sequential behavior to be exhibited by the automated kinematic machine.

BACKGROUND OF THE INVENTION

In the generalized field of robotics, which is defined herein as the remote control and operation, either in response to discrete operator commands or autonomously, of plural function, multiple degree of freedom electro-optic, opto-mechanical, and or electromechanical systems, extant practices may incorporate one or more of telepresence, teleoperation, and telekinesis. In such robotic systems, calibrations, ranging from one-time measurements to periodic measurements of specific tooling points or arrays of known positions, to real time mensurations with concomitant program parameter updates, are commonly employed. Also, devices which utilize telepresence, telekinesis, and teleoperation with various control, operation, and calibration schemes are extensively documented in various patent literature, textbooks, technical publications, industry publications, and contemporary articles in a variety of popular publishing formats, including the Internet.

There are numerous current and future robotics operations, that differ in operating environments, functional sophistication, and criticality of correct and adequate operation. Industrial robots are widely used as automatons, repetitively performing the same sequence through the life of a production run. They may then be retooled and reprogrammed to perform a different set of tasks. Although generation of programs for this type of robotic application is not the prime focus of the present invention to be described below, a brief description will serve to elucidate some of the simple, underlying principles of robotics command program generation, and serve as initial introduction to telekinegenesis principles that are common to extant robotics system practices.

In cases of relatively simple automaton applications, the operating environment, motions required, effects of robot actions, physical calibrations, etc. are very well known, and explicitly definable in simple sequences and geometrical terms. The requisite actions are relatively easy to define in explicit, simple terms, and the command programs can be iterated and calibrated to near perfection. As programs of this sort may be used to generate large production runs, considerable time and money can be practically and economically invested to develop programs that yield the required results, particularly for operations such as pick and place, spot welding, fastener installation in set locations, and other similar functions that require simply definable motion parameters and sequences. Tasks such as these utilize telekinesis; that is, machines that are moved through a series of positions as specified by discrete kinematics commands. These machines employ calibrations with a wide range of sophistication, depending on the precision required.

Figure 1:
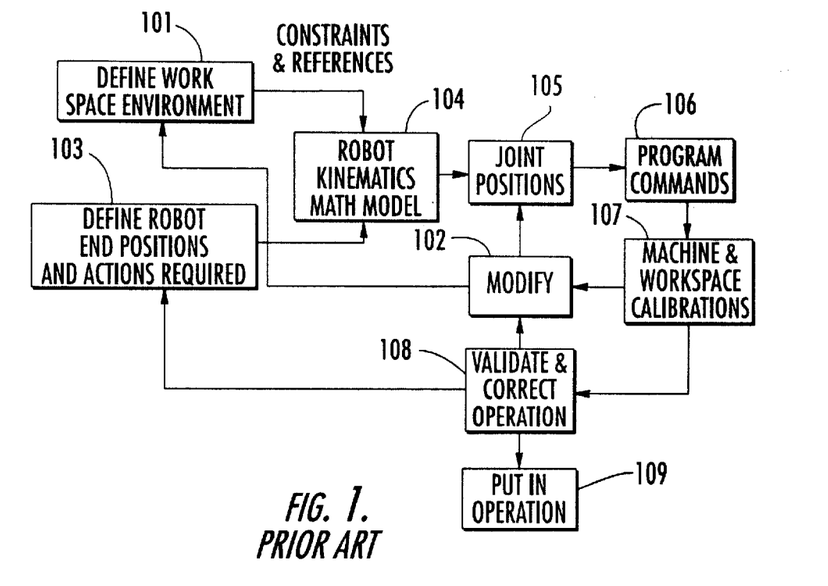
FIG. 1 diagrammatically is a functional block diagram showing the development of a conventional robotic control command sequence.

Development of a command sequence may be characterized as shown in the functional block diagram of FIG. 1. In general, as shown at 101, it is necessary to define the work space or task environment, which is typically updated or modified at 102, with the results of physical calibrations, modifications, etc. End position work points 103 are then mathematically defined at 104, and are translated into joint positions 105 and associated joint position commands 106. These joint position commands, in turn, usually require correction or modification 102 via machine and workspace calibration 107, depending on precision requirements for the operation. Except for the simplest of tasks, or those that are very mature, a validation process 108, with some subsequent modification at 102, is performed. Everything is then updated, and the system is put into operation at 109.

It should also be noted that, for most cases, the end effector position of a robotics assembly is not a unique function of the joint positions. Added constraints of work space envelopes and non interference with work piece and support structures limit the allowable sets of joint positions from which the programmer can then select. As the number of degrees of freedom of the robotics assembly increases, calibration requirements become more stringent and selection of the optimal joint position commands becomes less intuitive, and therefore more difficult for the program developer to specify correctly.

Functionally sophisticated tasks requiring intuitive, adaptive, human like control, such as installing gears in transmission assemblies or clamping bleeders with hemostats and installing sutures in a surgical operation, as non-limiting examples, often utilize teleoperation principles. Non-limiting examples of teleoperational robotic systems are described in the U.S. Patents to Kaneko et al, U.S. Pat. No. 5,341,458, and Aono et al U.S. Pat. No. 5,483,440.

Figure 2:
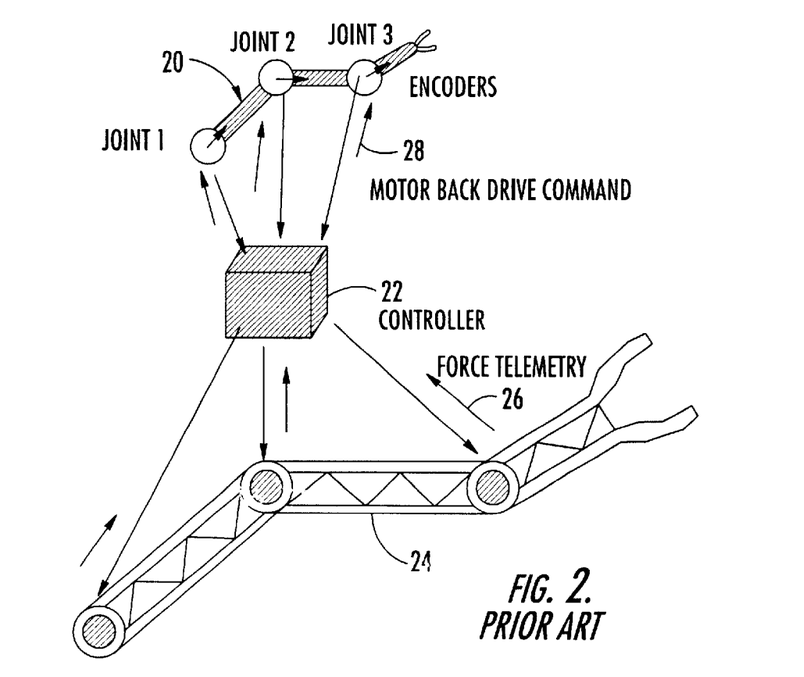
FIG. 2 diagrammatically illustrates a conventional tele-operational system.

As diagrammatically illustrated in FIG. 2, in a conventional teleoperational system, the operator manipulates a kinematics simulator (or master) 20, shown as having a plurality of joints 1, 2 and 3, the movement of which is sensed by a controller 22, to generate the position commands for a multijointed slave robotic manipulator 24 that actually performs the work. The slave may be in the proximity of the operator, or quite far away. Telepresence of some form is generally incorporated, in the form of remote video, measurement systems, and other sensors. Some teleoperation systems also incorporate tactile sensing and force feedback 26 from the slave 24 to the controller 22, and feedback 28 from the controller 22 to master 20. This feedback serves to provide the operator with some "feel" for what is happening at the slave.

In most applications, teleoperation has the additional benefit that operator-positioning of the robotic kinematics simulator is intuitive, as the operator is simply moving arms where he wants them, not commanding a joint and trying to anticipate where this will position everything. Since the operator is evaluating each move in real time and adapting his actions, work space and task environment definition does not require the mathematical precision of the previous example. Some advanced systems further incorporate some dynamic controls to eliminate natural tremor from the operator inputs, and provide precision position feedback as well.

Although teleoperation systems inherently lack the machine precision of telekinesis systems, they lend themselves quite well to managing functionally complex sequences, or operations where there is no a priori precision in task environment definition. Of course, if the operator makes an error, so does the slave. Sensing and process controls can ameliorate this, but it is still fundamental to the nature of this type of operation.

It should also be noted that, for teleoperation, scale differences between the master and slave can be quite large. A remotely operable crane, for example, can be operated using a small desktop scale model of the real crane. The teleoperational principle works reasonably well for a large number of degrees of freedom, and it may work well for coordinating more than one machine. Experimental teleoperational medical robots, for example, commonly employ both a right hand and left hand manipulating arm, which are operated in concert by the surgeon.

Applications for robotics operations are evolving, which have requirements for hi h reliability, functional complexity, high precision, and with failure consequences that mandate maximal validation during command program development and operation. A few examples of potential applications with these characteristics are conventional weapons disarming, nuclear weapons disassembly, toxic waste inspection and cleanup, and deactivation and cleanup of failed nuclear power plants such as Chernobyl.

These applications share a number of characteristics, such as high degree of functional complexity, coordination of multiple machine actions, task environments that may have unanticipated characteristics, generation of command programs and sequences with a very short or even real time development cycle, and failure consequences that mandate high fidelity operational validation with limited or no practice available. They also feature task environments that are either extremely hazardous or lethal to human operators, which mandates the use of robots, and reliance on remote measurements and calibration to update operating parameters in real time.

SUMMARY OF THE INVENTION

In accordance with the present invention, these needs are successfully addressed by what is referred to herein as a 'telekinegenesis' robotics command program generator and validation methods therefor. The telekinegenesis system of the invention involves a method and architecture for generating robotics system command programs, by combining the quantitative precision of traditional telekinesis with the intuitive, adaptive, sophistication of teleoperation, to realize a development and validation method that drastically reduces the time required for generating precise command and control, in combination with sophisticated kinematics coordination.

As will be described, the telekinegenesis system of the invention is capable of generating coordinated multiple degree of freedom mechanism motion sequences, spatial relationships for sequential kinematics parameter generation, coordination of sets of multiple degree of freedom robots, singly and in combination, as well as complete robotics command programs by concatenating measured kinematics simulator outputs with available robot command program generators. It may further include, singly or in combination, extant calibration methodology including a priori and real time methods, virtual reality simulation, and instruction modification by artificial intelligence system design tools such as ICAD and other similar tools.

The telekinegenesis system of the invention may also employ neural learning techniques, and may additionally incorporate, singly or in combination, modifications to the task environment model and operating constraints via remote measurement of the physical task environment. This may be accomplished either by sensors and measurement capabilities embodied in the robotics system, ancillary equipment, or measurement systems unrelated to the robotics system employed, with modification of the task environment model and subsequent modification of the robotics command set to adapt to the physical task environment, which may be different from the task environment model that was used to generate the initial set of commands.

Advantageously, using the telekinegenesis methodology of the invention, programs may be developed well in advance of the actual robotics operation, or may be used to generate sophisticated, program sequences during the actual operation itself with validation via virtual reality simulation, comparison of generated command positions with physical data, and analyzed for compliance with mission tenets, operating constraints, and system rules via artificial intelligence analysis of the generated sequence.

According to the functional operation of the telekinegenesis system of the invention, joint parameters of an operator-controlled simulator are sampled by a computer, and formatted for input to a robot program generator. By virtue of the simulation, the joint parameters are coordinated, and the robot program generator outputs a set of instructions required to command a robot to perform the same actions. This program is downloaded to a robot controller, which then executes the task.

In a practical implementation, the telekinegenesis system of the invention employs a virtual reality simulator that is driven with kinematic parameter data derived from a teleoperational device, which models the sequential behavior to be exhibited by the target machine to be controlled. The virtual reality simulation guides the end user through a menu-driven series of selection options and input requests that define the required work cell operation in an intuitive manner, with easily understood requests for quantitative inputs. The teleoperational device contains a plurality of geometrically distributed sensors mounted on a multi-axis adjustable, operator-manipulated leader unit. As the leader unit is manipulated to follow a desired travel path, the sensor outputs are processed by a geometry conversion algorithm executed by the teleoperational device, thereby generating data representative of the spatial kinematics of the desired travel path.

Where the software employed by the teleoperational device allows customization of the format of its output data, the data is preferably formatted so as to be directly interfaced with a kinematic machine simulator program installed in a robotic control simulation workstation. Should such data format customization not be afforded, the data is translated by means of an intermediate format translation algorithm to a format compatible with the simulator program.

The kinematic machine simulator program within the robotic control simulation workstation is configured to simulate a virtual machine based upon the actual design parameters of the target machine to be controlled. Thus, when executed, the simulation program presents the operator with a virtual reality, off-line representation of the target machine, whose on-line behavior is to be controlled. The virtual reality simulation program is interactive. As a consequence, in the course of monitoring the machine's dynamic behavior, which mimics he spatial kinematics of the travel path, the workstation operator is able to selectively interrupt the operation of the machine, modify its control parameters, and then rerun the program, to the extent necessary, until the desired behavior of the target machine is achieved.

Once the target machine's simulated kinematic behavior produced by the virtual reality simulation workstation exhibits the desired dynamic spatial geometry profile, customized spatial parameter data stored in the workstation is processed by the virtual reality simulation program, to produce a sequence of kinematic control instructions that are to be downloaded into the microcontroller of the target machine. These off-line sourced instructions, once downloaded into the target machine, are operative to cause the machine, when installed into an operational robotic system, to exhibit its intended on-line sequential kinematic behavior.

DETAILED DESCRIPTION

Before describing in detail the telekinegenesis system of the invention, it should be observed that the invention resides primarily in what is effectively a prescribed arrangement of commercially available kinematic geometry analysis, simulation and programming tools, together with digital signal processing components and an attendant supervisory control program therefor, that controls the operations of such tools and components. Consequently, the configuration of such tools and components and the manner in which they are interfaced with other system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow charts of the robotic behavior control sequence to be described are primarily intended to show the major components of the system in a convenient functional grouping and processing sequence, whereby the present invention may be more readily understood.

Figure 3:
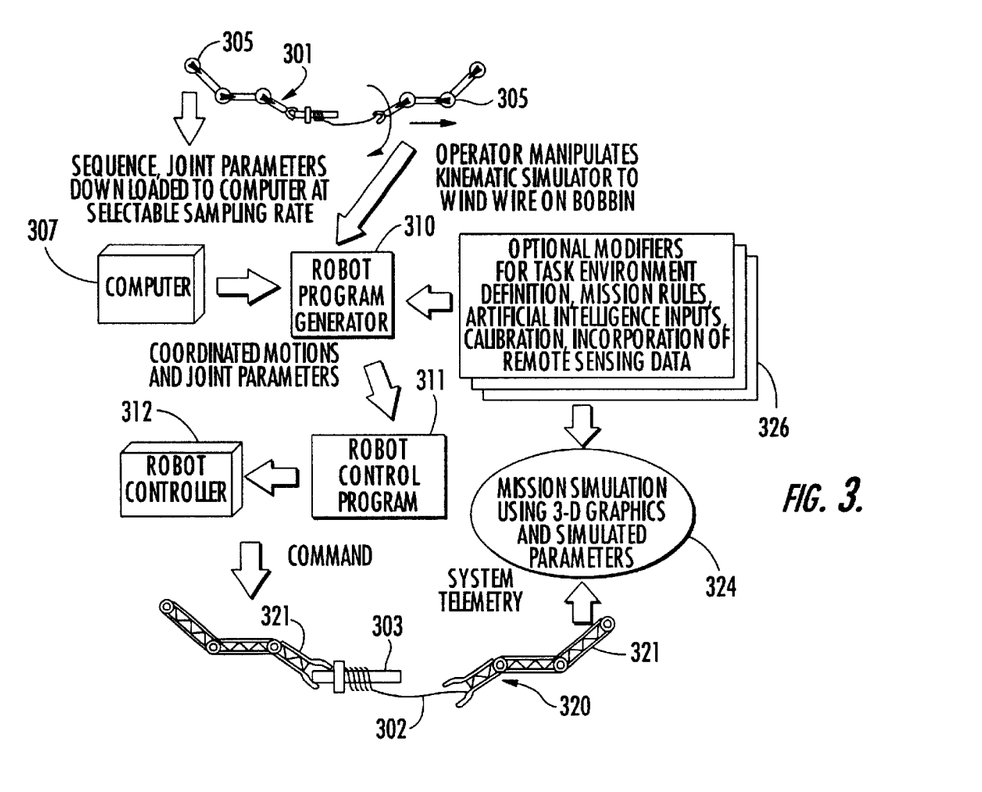
FIG. 3 diagrammatically illustrates functional components of a telekinegenesis robotic control system in accordance with the invention.

The functional components of a telekinegenesis robotic control system in accordance with the invention are diagrammatically illustrated in the operational task flow example of FIG. 3. For purposes of illustration, the functional flow diagram FIG. 3 is associated with the task of winding a wire on a bobbin, using two multiple degree of freedom robotics arms will be described. It should be noted, however, that the invention is not limited to this or any other application, and there is no limit on the number of degrees of freedom of the simulators. An embodiment of an actual telekinegenesis robotic control system implementation (and an operational flow chart therefor) will be described below with reference to FIGS. 4 and 5.

In the telekinegenesis operational flow example of FIG. 3, an operator (not shown) manipulates a multi-joint kinematics simulator 301 in order to wind a wire 302 on a bobbin 303. During this manipulation of the kinematics simulator 301 along a desired travel path, spatial and motion parameters of the joints 305 associated with that travel path are monitored by sensors and coupled to a computer 307, which formats the various joint parameter data for application to a robot program generator 310. As a non-limiting example, the robot program generator may comprise a commercially available Workspace robotic simulation application.

By virtue of the simulation executed by the robot program generator 310, the parameters of the various joints 305 of the simulator 301 are coordinated, and the robot program generator 310 generates a set of instructions 311 required to control a robotic controller 312. The robotic controller 312 then causes the desired task to be executed by sending command signals to robotic arms 321 of an operational robot 320 to perform the same actions.

It should be noted that this process of generating the programming instructions is intuitive, and takes relatively little time to perform. Series of such sequences can easily be concatenated, so as to quickly, efficiently, and reliably generate robot control programs that have a high degree of functional complexity that would be difficult to prescribe using conventional methodology. Using this relatively simple principle, other existing development tools may be employed to provide a complete development suite that adds precision, dynamic program simulation and visualization, and highly advanced artificial intelligence techniques, to enable timely development of precision control programs with a high degree of functional complexity and precision. Moreover, this methodology may be readily employed to adaptively incorporate unforeseen tasks in an existing operation under controlled circumstances.

Building on the simple instructions generations, program modifiers may be generated to reflect task environment definition, mission constraints and rules, calibration, and incorporation of remote sensing data of instruction modifications. For operations having a high degree of complexity, but a well established set of operating rules (as for the operational rules governing an endangered, contaminated nuclear power station recover, for example, or dismantling a nuclear weapon for another), the use of artificial intelligence design programs such as ICAD can be incorporated to enable timely development, even real time, of control programs that: go well beyond today's capabilities.

Mission simulation is performed with a high degree of effectiveness using 3-D simulation graphic features, shown at 324, incorporated into WorkSpace routine or other similar application programs. In many cases, the mission environment can be adaptively constructed in real time based on remote measurements and observations. Mission operations can be simulated using the kinematics simulators, double checked by graphic simulations and comparison with mission rules and other data 326 and then proceed with program execution.

Figure 4:
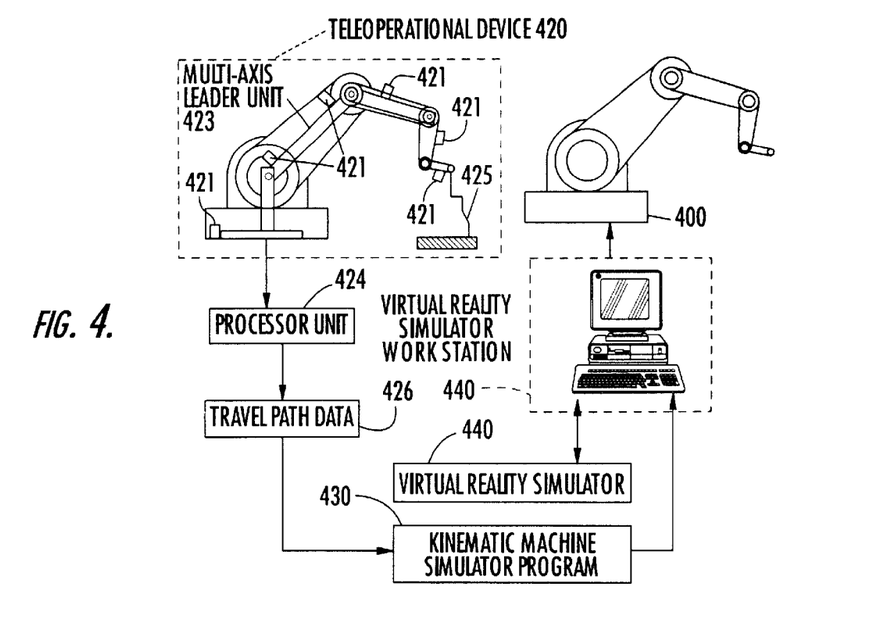
FIG. 4 diagrammatically illustrates a telekinegenesis system in accordance with the present invention for training the sequential kinematic behavior of an automated kinematic machine.

Attention is now directed to FIG. 4, which diagrammatically illustrates a system implementation that may be employed to execute the functionality of the components of a telekinegenesis scheme of the invention, for training the sequential kinematic behavior of an automated kinematic machine (or 'target' machine) 400 to perform a prescribed spatial manipulation task. In the system implementation of FIG. 4, a virtual reality simulator 410 is driven with kinematic parameter data derived from a teleoperational device 420, which models the sequential behavior to be exhibited by the target machine 400 to be controlled, as described above.

Figure 5:
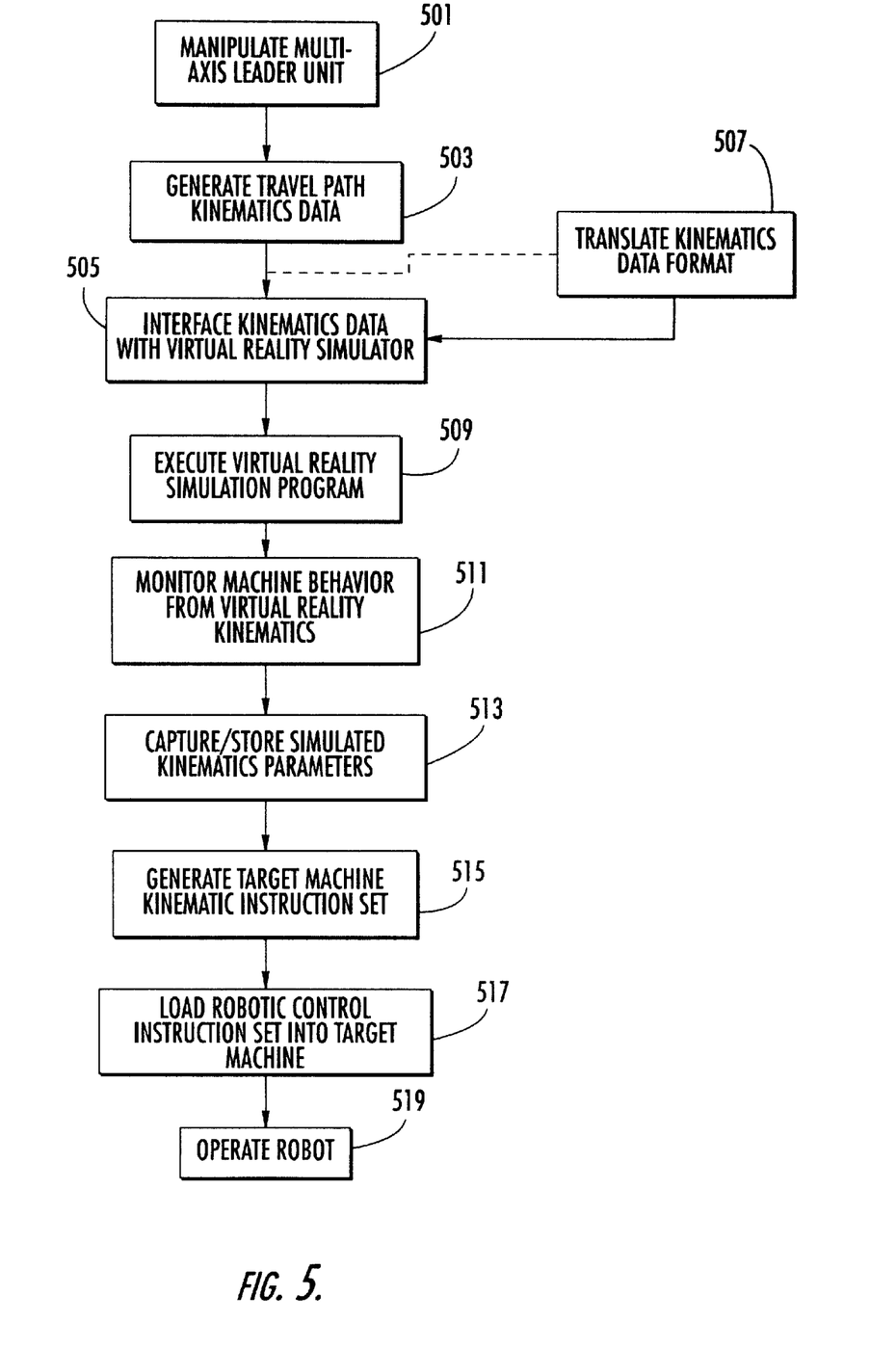
FIG. 5 is a flow chart associated with the telekinegenesis system diagram of FIG. 4.

Associated with the system implantation diagram of FIG. 4 is the flow chart shown in FIG. 5, which shows respective operational steps that are carried out by the components of the system of FIG. 4, to produce a kinematic behavior control program which, when downloaded into the target machine 400, will enable the target machine to precisely follow an off-line derived kinematic travel profile. As a non-limiting example, teleoperational device 420 may comprise a kinematic representation of a six-axis arm manipulator, which contains a plurality of geometrically distributed sensors 421 mounted on a multi-axis adjustable, operator-manipulated leader unit 423.

During manipulation of the leader unit 423 by the operator (step 501) along a desired travel path 425, the outputs of the sensors 421 are processed by the geometry conversion algorithm executed by the teleoperational device's microcontroller or processor unit 424, to generate data 426 representative of the spatial kinematics of this travel path 425 (step 503). The travel parameter data 426 is interfaced (step 505) with a kinematic machine simulator program 430, installed in a robotic control simulation workstation 440. During its execution (step 509) on workstation 440, the simulation program 430 presents the operator with a virtual reality, off-line representation of the manipulation of the target machine 400, whose on-line behavior is to be controlled. The virtual reality simulation program provides for collision detection, reach analysis, and detects any singularity points in the requested operations.

It should be noted that, unlike a conventional teleoperational system of the type described in the above-referenced Kaneko et al and Aono et al patents, the travel parameter data 426 supplied to and its processing by the kinematic machine simulator program 430 of robotic control simulation workstation 440 are associated with the intended kinematic operation of the target machine 400, rather than a plurality of potential 'target' points from which a robotic control sequence is selected as a result of a trial and error analysis of those points.

The fact that the virtual reality simulation program 430 is interactive means that, in the course of monitoring (step 511) the machine's simulated dynamic behavior, which is intended to mimic the spatial kinematics of the travel path 425 represented by the data previously generated in step 503, the workstation operator is able to selectively interrupt the operation of the machine, modify its control parameters, and rerun the program, as necessary, until the desired behavior is achieved (step 513). The simulation output includes animation, and estimated position accuracy for all work points and operations as a function of speeds and payload. Menu selectable routines displayed at the operator's workstation 440 provide for throughput analysis and optimization for given accuracy requirement inputs.

Where the software employed by the teleoperational device 420 allows customization of the format of its output data, the data is preferably formatted so as to be directly interfaced (step 505) with a kinematic machine simulator program 430, installed in a robotic control simulation workstation 440. Should data format customization not be afforded, the data is translated (step 507) by means of an intermediate format translation algorithm 440 to a format acceptable by the simulator (e.g., Workspace) program 430.

When executed (step 509) on workstation 440, the simulation program 430 presents the operator with a virtual reality, off-line representation of the target machine, whose on-line behavior is to be controlled. The virtual reality simulation program provides for collision detection, reach analysis, and detects any singularity points in the requested operations. Because the virtual reality simulation program 430 is interactive, then in the course of monitoring (step 511) the machine's simulated dynamic behavior, which is intended to mimic the spatial kinematics of the travel path 425 represented by the data previously generated in step 503, the workstation operator is able to selectively interrupt the operation of the machine, modify its control parameters, and rerun the program, as necessary, until the desired behavior is achieved (step 513). The simulation output includes animation, and estimated position accuracy for all work points and operations as a function of speeds and payload. Menu selectable routines displayed at the operator's workstation 440 provide for throughput analysis and optimization for given accuracy requirement inputs.

Calibration data, including encoder and machine dynamic measurements for the specific robot being programmed are included in the simulation. Forward error correction is provided by incorporating inertial effects and calibration data in the dynamic path planning, and providing rates and accelerations that keep predicted dynamic excursions within specified error tolerances. This defines a set of positions, velocities, and accelerations used by a real time controller as inputs.

Once the operator is satisfied that the target machine's simulated kinematic behavior produced by the virtual reality simulation workstation 440 exhibits the desired dynamic spatial geometry profile, the currently customized spatial parameter data 'stored in the workstation 440 is processed by the virtual reality simulation program 430 (step 515), to produce a sequence of kinematic control instructions of an applications program to be downloaded into the microcontroller of the target machine 400, for controlling the robot and work cell, with the application program being written in the robot's native language.

In generating the application program, the entire kinematic path of the robot is examined and defined so as to account for inertial effects and actual machine calibration data. These off-line sourced instructions, once downloaded into the target machine 400 (step 517), are operative to cause the machine, when installed into an operational robotic system, to exhibit its intended on-line sequential kinematic behavior (step 519).

As will be appreciated from the foregoing description, the telekinegenesis system of the invention provides a systematic controls systems design, that accounts for the entire robot operation, accommodating structural deflections and random control land signal errors, in addition to traditional servo control loops, and provides substantial improvements in routine maintenance, down-time, throughput rate, payload capacity, and position accuracy. Substantive enhancements of speed, accuracy, and payload capability of exiting robots for generalized applications are provided by the ability to: customize the dynamic calibration of the target robot.

The sequential kinematic behavior of the target robot is readily trained by a virtual reality simulator that is driven with kinematic parameter data derived from sensors of a teleoperational device, which models the sequential behavior to be exhibited by the target robot. The kinematic machine simulator program within a robotic control simulation workstation simulates a virtual machine based upon the actual parameters of the robot. Since the virtual reality simulation program is interactive, workstation operator can selectively interrupt the operation of the machine, modify its control parameters, and then rerun the program, until the desired behavior of the target machine is achieved. The sequence of kinematic control instructions that are downloaded into the microcontroller of the target machine are operative to causes the robot to exhibit its intended on-line sequential kinematic behavior.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. A method of controlling the operation of an automated kinematic device comprising the steps of:

(a) operating a teleoperational sensory machine to generate spatial position data that describes a sequence of operational movements of a kinematic travel path, to be followed by components of said automated kinematic device, during a desired sequential kinematic behavior thereof, along a sequence of spatial conditions that define a desired dynamic spatial geometry profile along which said automated kinematic device is to travel during operation thereof;

(b) generating a virtual reality simulation of kinematic behavior of said automated kinematic device along said sequence of spatial conditions that describe said desired dynamic spatial geometry profile along said prescribed sequential kinematic travel path to be followed by said automated kinematic device in accordance with said data generated in step (a);

(c) generating, from the kinematic behavior of said automated kinematic device simulated in step (b), a sequence of instructions which, when executed to control the operation of said automated kinematic device, cause said automated kinematic device to exhibit said desired sequential kinematic behavior along said sequence of spatial conditions that describe said desired dynamic spatial geometry profile along said prescribed sequential kinematic travel path; and (d) controlling the operation of said automated kinematic device in accordance with said sequence of instructions generated in step (c), thereby causing said automated kinematic device to exhibit said desired sequential kinematic behavior along said sequence of spatial conditions that describe said desired dynamic spatial geometry profile of said prescribed sequential kinematic travel path.

2. A method according to claim 1, wherein step (b) includes, in the course of generating said virtual reality simulation, selectively interactively modifying one or more parameters of said virtual reality simulation sequential kinematic behavior of said automated kinematic device, as necessary, to enable said automated kinematic device to realize said dynamic spatial geometry profile of said prescribed sequential kinematic travel path.

3. A method according to claim 1, wherein said automated kinematic device comprises a multi-axis robot.

4. A system for controlling the operation of an automated kinematic device comprising:

a travel path generation unit which is operative to generate data representative of a sequence of movements to be followed by components of said automated kinematic device, during a desired sequential kinematic behavior thereof, along a sequence of spatial conditions subsequent to a starting condition of said automated kinematic device, said sequence of spatial conditions describing a desired dynamic spatial geometry profile of a prescribed sequential kinematic travel path of said automated kinematic device; and a virtual reality simulator coupled to said travel path generation unit, and which is operative to generate a virtual reality simulation of kinematic behavior of said automated kinematic device along said sequence of spatial conditions that describe said desired dynamic spatial geometry profile along said prescribed sequential kinematic travel path to be followed by said automated kinematic device in accordance with said data generated by said travel path generation unit, and to produce a sequence of instructions which, when executed to control the operation of said automated kinematic device, cause said automated kinematic device to exhibit said desired sequential kinematic behavior along said sequence of spatial conditions that describe said desired dynamic spatial geometry profile of said prescribed sequential kinematic travel path.

5. A system according to claim 4, wherein said virtual reality simulator is operative, in the course of generating said virtual reality simulation, to selectively modify one or more parameters of said simulated sequential kinematic behavior of said automated kinematic device, as necessary, to enable said automated kinematic device to realize said dynamic spatial geometry profile of said prescribed sequential kinematic travel path, and to generate said sequence of instructions for controlling the operation of said automated kinematic device, in accordance with one or more parameters which have been selectively modified.

6. A system according to claim 4, wherein said automated kinematic device comprises a multi-axis robot.

* * * * *

UNITED STATES PATENT AND TRADEMARK OFFICE
CERTIFICATE OF CORRECTION

PATENT NO.    : 6,445,964 B1
DATED         : September 3, 2002
INVENTOR(S)   : John E. White, Hollis Ambrose and Brent A. Stancil It is certified that error appears in the above-identified patent and that said Letters Patent is hereby corrected as shown below:

<u>Title page,</u>
Item [57], ABSTRACT,
Line 22, delete "micro controller" insert -- microcontroller --

<u>Column 1,</u>
Line 26, delete "out" insert -- output --

<u>Column 3,</u>
Line 27, delete "hi h" insert -- high --

<u>Column 5,</u>
Line 8, delete "he" insert -- the --

<u>Column 6,</u>
Line 21, delete "Workspace" insert -- WorkSpace --
Line 57, delete "that:" insert -- that --

<u>Column 8,</u>
Line 42, delete "data '" insert -- data --
Line 66, delete "to:" insert -- to --

Signed and Sealed this

Fifteenth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,445,964 B1                                                   Page 1 of 1
DATED          : September 3, 2002
INVENTOR(S)    : John E. White, Hollis Ambrose and Brent A. Stancil It is certified that error appears in the above-identified patent and that said Letters Patent is hereby corrected as shown below:

<u>Title page,</u>
Item [57], ABSTRACT,
Line 22, delete "micro controller" insert -- microcontroller --

<u>Column 1,</u>
Line 26, delete "out" insert -- output --

<u>Column 3,</u>
Line 27, delete "hi h" insert -- high --

<u>Column 5,</u>
Line 8, delete "he" insert -- the --

<u>Column 6,</u>
Line 21, delete "Workspace" insert -- WorkSpace --
Line 57, delete "that:" insert -- that --

<u>Column 8,</u>
Line 42, delete "data '" insert -- data --
Line 66, delete "to:" insert -- to --

Signed and Sealed this

Nineteenth Day of August, 2003

JAMES E. ROGAN
*Director of the United States Patent and Trademark Office*